UNITED STATES PATENT OFFICE.

ALBERT R. FRANK, OF SPANDAU, GERMANY, ASSIGNOR TO AMERICAN CYANAMID COMPANY, OF NASHVILLE, TENNESSEE, A CORPORATION OF MAINE.

FERTILIZER.

1,074,785.  Specification of Letters Patent.  Patented Oct. 7, 1913.

No Drawing. Application filed August 25, 1909, Serial No. 514,565. Renewed June 15, 1913. Serial No. 774,450.

*To all whom it may concern:*

Be it known that I, ALBERT R. FRANK, a subject of the German Emperor, residing at Spandau, Germany, have invented certain new and useful Improvements in Fertilizers; and I do hereby declare the following to be a full, clear, and exact description of the invention, such as will enable others skilled in the art to which it appertains to make and use the same.

This invention relates to fertilizers and has for its object the production of a nitrogen containing fertilizer of the calcium cyanamid type which will contain less free calcium oxid or lime, than is the case at present.

The use as a fertilizer of products containing nitrogen, such as, for example, calcium cyanamid, otherwise known as lime nitrogen, which at present may be obtained through the action of nitrogen upon carbids of alkaline earth metals or their carbid forming mixtures, entails many annoyances, owing to the fact that, the products obtained easily form a dust when they are used, and, thereby, render it disagreeable for the laborers to handle the same. In addition to this considerable losses are encountered by reason of the material itself being blown away in the form of a dust; and as the said material is more or less hygroscopic, the storing or transportation of the same is also attended with difficulties. Again, the fertilizers of this type contain their nitrogen almost exclusively in the form of cyanamid salt which, in the soil, must first be converted into the form of nitrates before it can serve as a plant food. This latter circumstance renders difficult the employment of the lime-nitrogen in all such cases where it is a question of offering to the plants ready formed and directly assimilable nitrogen. The presence of calcium oxid (CaO) in the cyanamid or lime-nitrogen, practically forbids, moreover, a mixing of the same with superphosphates, in case it is desired to preserve the water soluble phosphoric acid in the superphosphate, because the free calcium oxid of the lime-nitrogen can cause transformations of the water soluble phosphoric acid, under certain circumstances, even into a phosphoric acid compound insoluble in the ground. In order to avoid all these inconveniences, I mix in a more or less moist state or in solution, the nitrogen containing products of the type above mentioned with acid salts of metals, such as the alkali metals, or as the alkaline earth metals. That is to say, all these disadvantages are removed when these nitrogen containing products, such as lime nitrogen or the like, are mixed either when almost dry or in solution, with acid salts of the alkali metals or alkaline earth metals, as for example, the bi-sulfates, residues of nitric acid manufacture, poly-sulfates, bi-carbonates or the like. In this way the free lime of the lime nitrogen is converted into a sulfate, a carbonate or the like, and a product is thereby obtained which is not a dust-like powder nor is it hygroscopic. Further, a part of the cyanamid salt is converted into ammonia and thereby nitrogen in the form of ammonium sulfate, ammonium carbonate or the like, is obtained and in this form under most conditions of vegetation it can be easily assimilated by plants. Since in mixing such acid salts with lime nitrogen, no over-heating takes place but only a slow conversion occurs, there are no losses in nitrogen as is the case by the action of sulfuric acid upon lime nitrogen.

What I claim is:—

1. A non-dusting nitrogen containing fertilizer of the cyanamid type containing free lime and having admixed therewith an acid sulfate adapted to neutralize a portion of said lime, substantially as described.

2. A non-dusting nitrogen containing fertilizer containing a cyanamid salt, free lime, and an acid sulfate containing a metal having alkaline properties, substantially as described.

3. A non-dusting nitrogen containing fertilizer containing a cyanamid salt, free lime and an acid sulfate of an alkaline earth metal, substantially as described.

In testimony whereof, I affix my signature, in presence of two witnesses.

ALBERT R. FRANK.

Witnesses:
WOLDEMAR HAUPT,
HENRY HASPER.